Jan. 10, 1956   H. S. DOMBROWSKI ET AL   2,730,353
SECTIONALIZED REACTION VESSEL
Filed May 5, 1955
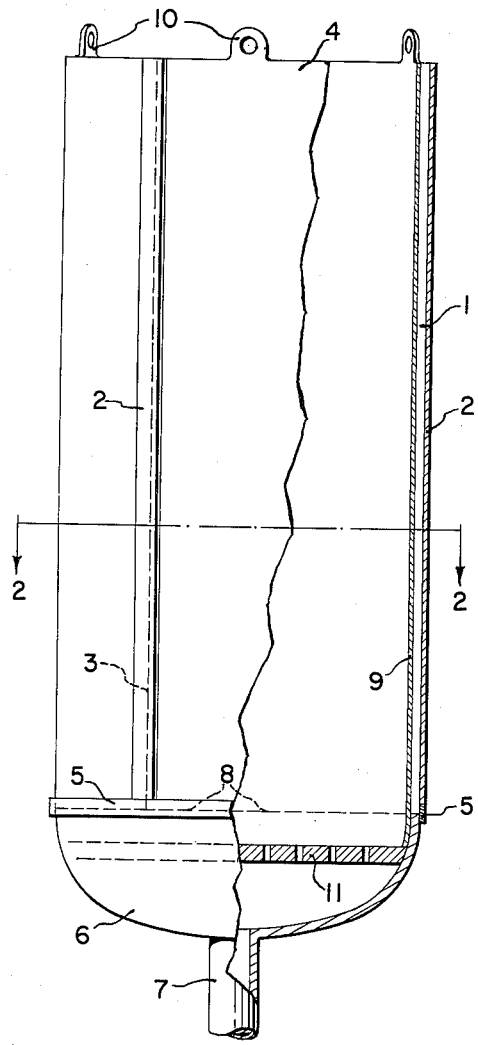
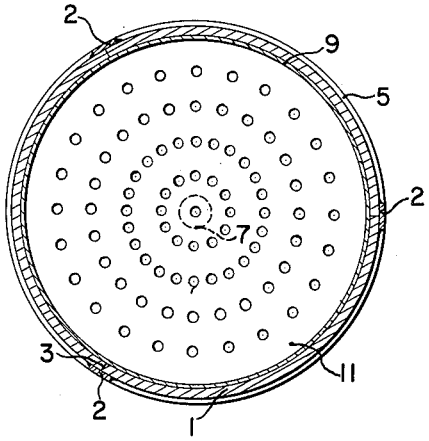
INVENTORS
HENRY S. DOMBROWSKI
CARL W. SANDERS, JR.
& EUGENE WALL
BY *Francis J. Crowley*
ATTORNEY

United States Patent Office 2,730,353
Patented Jan. 10, 1956

2,730,353
SECTIONALIZED REACTION VESSEL

Henry S. Dombrowski and Carl W. Sanders, Jr., Wilmington, and Eugene Wall, Seaford, Del., assignors to E. I. du Pont de Nemours and Company, Wilmington, Del., a corporation of Delaware Application May 5, 1955, Serial No. 506,212

4 Claims. (Cl. 266—43)

This invention relates to a reaction vessel for the preparation of titanium, zirconium or hafnium metals. More particularly, the invention relates to a reaction vessel for a process in which the halide of titanium, zirconium or hafnium is reduced to the metal in a closed batch reactor.

In the production of titanium metal, a reaction vessel, containing an expendable light gage reactor liner, is charged with magnesium metal and heated under an inert atmosphere to the melting point of magnesium. Titanium tetrachloride is then admitted to the vessel where it vaporizes and reacts with the molten magnesium to form titanium sponge. The temperature of the reaction is usually above the melting point of the magnesium chloride by-product with temperatures in the order of 750° C. to 950° C. prevailing, so that the titanium produced adheres to the steel wall of the reactor liner. When the expendable light gage liner on which the titanium sponge adheres is removed from the reaction vessel, the bottom of the liner is cut off and the liner is cut axially to permit peeling the light gage steel liner from the titanium sponge.

This process, however, has the disadvantage of requiring a new liner for each batch thereby keeping operating costs high. Furthermore, titanium produced by this method usually contains a small percentage of iron as an impurity which affects the properties of the metals.

It is an object of this invention to provide a reusable liner for a reaction vessel used in the preparation of titanium, zirconium or hafnium by reduction of the corresponding halides. Another object of this invention is to provide a quicker, easier and less costly method of producing such metals. It is a still further object to provide a purer form of the metal end product.

These objects and others are obtained by the use of a novel, heavy-wall, reusable liner having a titanium-iron skin which limits the rate of iron transfer from the liner to the magnesium and the sponge titanium contained within the vessel. If zirconium or hafnium is being reduced, the skin would comprise a diffusion of iron in one of these metals.

For a clearer understanding of the invention, reference is made to the accompanying drawing.

Fig. 1 is a front elevation of a preferred form of the liner partly in section.

Fig. 2 is a section plan on line 2—2 of Fig. 1.

The metal liner as shown comprises three curved sidewall sections 1, the longitudinal edges of these sidewalls adjoining each other to form a hollow cylinder. Welded steel laps, or "zipper," strips 2 cover the exterior of the joints of the adjoining edges 3 from the rim of the liner 4 to a welded circumferential lap strip 5 which connects the other rim of the cylinder to a dished head 6 containing a drain line 7. This circumferential lap strip 5 covers the remaining portion of the longitudinal joint 3 and the joint 8 between the rim of the cylinder and the dished head 6. On the inside surface of the sidewalls, there is an iron titanium skin 9 which keeps the iron content of the titanium sponge at a minimum. The free edge of the sidewall section may have lugs 10 through which a chain or a hook can be inserted when the liner is to be hoisted about. The perforated metal plate 11 in the bottom of the liner is to prevent lumps of metal from clogging the drain outlet 7.

The liner, as described, is easily inserted in a conventional reactor and the reduction of titanium chloride by molten magnesium is carried out within the inner titanium iron surface of the vessel. After completion of the reaction, the liner is removed from the reactor and the lap strips 2 and 5 are sheared with a pneumatic chisel or other cutting tool. This operation throws open the container and permits easy removal of the titanium metal sponge. Reuse of the liner is made possible by reassembling the sidewalls with new zipper strips and rewelding the dished head to one end of the cylinder in the manner already described.

While the invention has been described in respect to a liner having three sectional sidewalls, it should be understood that the design may be varied so that the cylinder comprises two, three, four or more of such sections. Low carbon steel is the preferred construction material, but molybdenum, tungsten and tantalum are also suitable. The thickness of these sectional sidewalls may be varied by one skilled in the art; however, a metal of from $1/8''$ to $1/2''$ in thickness will be found to give good service. The thickness of the steel lap strips which join the sections is also a matter of choice for one skilled in the art. A 14-gage strip, or a strip with a thickness of from .01 to .1" makes for easy cutting when disassembling. Steel has been the metal heretofore mentioned for the lap strips, but the choice of metal is not critical and other suitable construction metals can be selected by one skilled in the art.

The titanium-iron skin on the inner wall of the liner might also be described as a diffused layer of these metals. This layer is formed by the initial reduction reactions which are carried out within the vessel. The value of this diffused layer in reducing the iron content of titanium is apparent from the following table:

Reusable liner having diffused layer of Fe and Ti on its inner surface

| Use | No. of Liners | Percent Fe | BHN* |
|---|---|---|---|
| 1st | 17 | .12 | 125 |
| 2nd | 17 | .13 | 130 |
| 3rd | 13 | .11 | 124 |
| Average | | .12 | 126 |

PRIOR PRACTICE

| | | | |
|---|---|---|---|
| Plant Average (14-gage expendable liner) | | .21 | 132 |

*Brinell hardness number.

From this table, it is seen that the use of the liner of this invention resulted in over 41% reduction in the iron content of the titanium and also a significant improvement in the Brinell hardness number. The diffused layer of iron and titanium was produced on the liners by the first reaction in the liners. It might also be interesting to point out that in the initial reactions which were carried out in order to prepare 21 liners with a diffused layer of iron and titanium, the average iron content was .18% which is a significant improvement over the plant average. This initial improvement is considered the result of an increased rate of heat transfer which is permitted by the use of a heavier walled liner. In subsequent plant operations with liners of this invention, the quality of the Ti for a four week running period has averaged .10% Fe with a B. H. N. of 121.

While the invention has been illustrated by a cylindrical vessel with a dished head since this is conventional shape for reactors of this type, other shaped liners may also be used. For example, the sidewalls might be sectional pieces which form a conical, pyramidal, elliptical or cubical structure, and the head of the liner could be a disc or a frustrum of a cone or of a pyramid. In addition to welding the lap strips to the adjoining sidewalls, one could also use rivets or bolts as securing means. Furthermore, the liner may be welded with a weld material that embrittles on cooling permitting simple removal of the light gage lap strips.

In addition to an improvement in the quality of the metal end product, this invention also presents a simplified method of removing the material from the reactor without destroying the containing vessel. As a result, a saving in cost is effected due to the increased percentage of quality sponge and to the reduction in investment and operating costs.

We claim:

1. A metal reaction vessel comprising a plurality of adjoining metal sidewall sections formed into an enclosure, the inside surface of said enclosure being composed of a diffused layer of the metal of said sidewall and a metal selected from the group consisting of titanium, zirconium and hafnium, a metal head adjoining a rim of said enclosure, thin metal strips covering both the exterior joint between said rim and said head and the exposed exterior joints of the adjoining sidewalls, and means for securing said metal strips on both sides of said joints.

2. A metal reaction vessel comprising a plurality of adjoining metal sidewall sections formed into an enclosure, the inside surface of said enclosure being composed of a diffused layer of iron and titanium, a metal head adjoining a rim of said enclosure, thin metal strips covering both the exterior joint between said rim and said head and the exposed exterior joints of the adjoining sidewalls, and means for securing said metal strips on both sides of said joints.

3. A metal reaction vessel comprising a plurality of adjoining metal sidewall sections formed into an enclosure, the inside surface of said enclosure being composed of a diffused layer of iron and titanium, a metal head adjoining a rim of said enclosure, thin metal strips covering both the exterior joint between said rim and said head and the exposed exterior joints of the adjoining sidewalls, and said strips being welded to sidewalls on both sides of said joints.

4. A metal reaction vessel comprising a plurality of curved metal sidewall sections formed into a cylinder, the inside of said cylinder being composed of a diffused layer of iron and titanium, a dished metal head containing a centrally located aperture adjoining a rim of said enclosure, thin metal strips covering both the exterior joint between said rim and said head and the exposed exterior joints of the adjoining sidewalls, and said strips being welded to sidewalls on both sides of said joints.

No references cited.